D. HEGGIE.
PIPE ROUNDING MECHANISM.
APPLICATION FILED MAY 19, 1914.
1,179,919.
Patented Apr. 18, 1916.
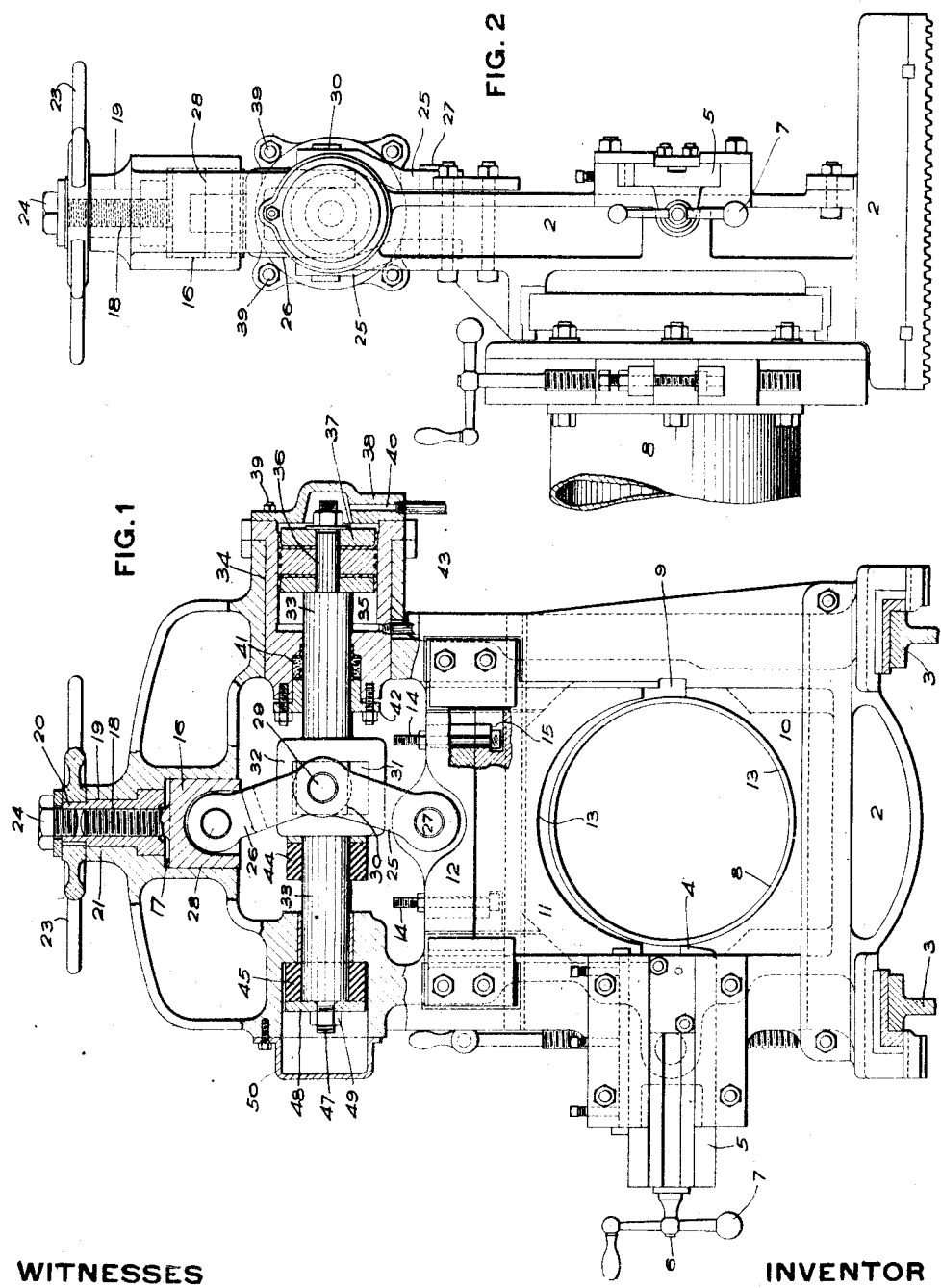
WITNESSES
INVENTOR
David Heggie
by Charles C. Linthicum
his Attorney

UNITED STATES PATENT OFFICE.

DAVID HEGGIE, OF LORAIN, OHIO, ASSIGNOR TO NATIONAL TUBE COMPANY, OF PITTSBURGH, PENNSYLVANIA, A CORPORATION OF NEW JERSEY.

PIPE-ROUNDING MECHANISM.

1,179,919.     Specification of Letters Patent.     Patented Apr. 18, 1916.

Application filed May 19, 1914. Serial No. 839,539.

*To all whom it may concern:*

Be it known that I, DAVID HEGGIE, a citizen of the United States, residing in Lorain, in the county of Lorain and State of Ohio, have invented certain new and useful Improvements in Pipe-Rounding Mechanisms, of which the following is a specification.

My invention relates to apparatus used in finishing wrought metal pipes and tubes, and is particularly designed for use in the preparation of the ends of such pipes and tubes preparatory to cutting the threads on the ends of the pipes or tubes.

In the manufacture of the large sizes of pipes and tubes, the ends thereof are liable to be distorted somewhat so as not to be exactly or truly round and cylindrical. The result is that a perfect thread is not formed when cutting the threads on the ends of the pipes or tubes, the thread being shallow in some places or being cut too deeply on other places on the surface of the pipe, or both.

One object of my invention is to provide means for rounding the ends of the tubes so as to make them truly cylindrical preparatory to cutting the threads thereon.

Another object of my invention is to provide pipe rounding mechanism having novel means for actuating the rounding blocks forming part of the apparatus, in the pipe rounding operations.

A further object of my invention is to provide pipe rounding apparatus having improved means for adjusting the stroke or extent of relative approaching movement of the rounding blocks in the pipe rounding operations.

A still further object of my invention is to provide a pipe rounding mechanism which is applicable for use in connection with the pipe threading apparatus.

Still further objects of my invention will appear as the invention is more fully explained hereinafter and specifically pointed out in the appended claims.

Referring to the accompanying drawings forming part of this specification, Figure 1 is an end elevation, partly in section, showing a pipe rounding mechanism constructed and arranged in accordance with my invention and applied for use on the tool carriage of a pipe threading machine. Fig. 2 is a side elevation of the apparatus shown in Fig. 1.

In the accompanying drawings the numeral 2 designates the tool carriage of a pipe threading machine which is mounted on the slides or shears 3 of the machine, so as to be movable lengthwise of the slides 3.

In the type of threading machine shown the head stock, (not shown), is provided with a suitable gripping mechanism which engages with and positively rotates the pipe while one end of the pipe is being engaged by the thread cutting die, or tool 4 of the apparatus in cutting the threads thereon. The threading die 4 is removably secured in a horizontally adjustable slide 5 which is movably mounted on one side of the carriage 2 so as to be horizontally adjustable. A feed screw 6 having a handle 7, of the usual known construction, is employed to adjust the slide 5 and die 4 toward and away from the axial center of the pipe 8 upon which the thread is being cut.

The carriage 2 is provided with a window 9 in which the bottom rounding block 10 and vertically movable upper rounding block 11 are mounted. The rounding blocks 10 and 11 have opposed curved surfaces 13, 13, which, when the rounding blocks are in closed or pipe rounding position, form a true circle, of the diameter of the pipe being operated upon. A supply of rounding blocks of various sizes will be kept on hand to afford means for rounding the ends of the numerous sizes of pipes and tubes manufactured or to be threaded. The rounding blocks 10 and 11 will necessarily be changed from time to time, to suit the particular size of pipe or tube being threaded. The upper block 11 is detachably connected to a chuck 12 by means of bolts 14, the heads of these bolts engaging slots or recesses 15 in the upper face of the upper rounding block 11 and extending through suitably located slotted holes in the chuck 12.

On the carriage 2, above the rounding blocks 10 and 11 is an adjusted head, 16, which is arranged to move vertically in the seat 17 in the upper portion of the carriage 2. The head 16 is provided with an upwardly extending screw threaded portion 18 which projects into the internally threaded nut 19 on the upper portion of the carriage 2. The nut 19 is provided with a reduced portion 20 extending above the face of the boss 21 on the upper portion of the carriage 2 and a hand wheel 23 is keyed to the reduced portion 20 of the nut 19. A cap bolt 24 on the nut 19 serves to secure the hand wheel 23 in place on the nut.

The chuck 12 and adjusting head 16 are connected together by means of the toggle links 25 of which there are two and a forked toggle link 26, the lower end of the toggle links 25 being pivotally secured within the recesses in the adjusting head 16 by means of a pin 27 and the upper end of the forked link 26 being pivotally secured to the adjusting head 16 by the pin 28. The overlapping ends of the links 25 and 26 are pivotally secured on a pin 29 extending through an opening in the sliding shoe 30, which is movably mounted within the recess 31 of the intermediate portion 32 of the plunger 33. The two links 25 and the forked ends of the link 26 on each side of the shoe 30, are arranged to engage with the projecting ends of the pin 29.

Removably secured on one side of the carriage 2 above the rounding blocks, in a recess 34, is a fluid pressure cylinder 35, and the plunger 33 is provided on one end with a reduced portion 36 on which the piston 37 is mounted, this piston being positioned within the cylinder 35. A cylinder head 38 serves to close the open end of the cylinder 35, being secured in place by bolts 39 in the usual known manner, and the port or fluid pressure inlet 40 for one end of the cylinder is conveniently formed in the cylinder head 38, as is shown in Fig. 1.

The cylinder 35 is provided with a stuffing box 41 and gland 42 for the plunger 33, which are of the usual construction and a port 43 is provided in the stuffing box end of the cylinder.

The plunger 33 is provided with a cylindrical portion which extends through a bushed opening in the other side of the carriage 2. Secured on this end of the plunger 33 are rubber buffers 44 and 45. The buffer 44 on the plunger 33 engages with a washer 46, which in turn engages with the end of the rectangular portion 32 of the plunger. The end of the plunger 33 is provided with a reduced portion 47 which is screw threaded and the washer 48 and nut 49 on the reduced portion 47 of the plunger serves to hold the rubber buffer 45 in place. A removable cap or cover 50 is provided to surround the opening in which the buffer 45 on the end of the plunger is mounted.

In the operation of my improved apparatus bottom and top rounding blocks, 11 and 12 of the proper size are placed in position in the window 9 of the carriage 2 and the top rounding block is connected to the head 12 by means of the bolts, 14, 14. The hand wheel 23 is then turned to rotate the nut 19 and thereby adjust the head 16 vertically so that when the pivotal centers of the toggle links 25 and 26 are all in the same vertical plane, the upper vertically movable rounding block 11 will be caused to descend the required distance, and the curved surfaces 13 on the rounding blocks 10, 11 will form a true circle when the uppermost block 11 is in its lowermost position. The apparatus is then in readiness to operate upon the ends of the pipes or tubes to be threaded. Air or other fluid pressure is then admitted through the inlet 43 to the rear end of the fluid pressure cylinder 35 so as to move the piston 36 and plunger 37 into the position shown in the drawing, this movement of the plunger lifting the top rounding block 11. The end of the pipe or tube 8 to be operated upon or rounded is then inserted between the rounding blocks and fluid pressure is then admitted through the port 40 into the opposite end of the cylinder 35. The plunger 33 is then moved lengthwise and the toggle links 25 and 26 cause a relative approach of the rounding blocks 10 and 11. The curved surfaces 13 of the rounding blocks engage with the end of the pipe 8, and make the portion of the pipe contacting with these surfaces truly cylindrical and in condition for the threading operation.

The buffers 44 and 45 on the plunger 33, by engagement with the stop formed on the carriage 2, cushion the reciprocating movement of the plunger 33 in bringing the plunger to a stop and prevent damage to the apparatus. The reciprocating movements of the top rounding blocks 11 are then repeated as often as is necessary, the pipe 8 being turned axially between the downward movements of the block 11 to bring successive different portions of its surface into engagement with the rounding blocks so as to insure the end of the pipe being made cylindrical. The opposite end of the pipe or tube 8 is then engaged by a clutch (not shown), forming part of the pipe threading machine, and the pipe or tube is thereby caused to rotate, after which the thread cutting tool or die 4 is moved into cutting engagement with the now rounded end of the pipe, which has been moved lengthwise from between the rounding blocks into cutting position and the threads are then cut upon the end of the pipe or tube. The above described operations are then repeated with successive pipes and the ends of these pipes put in the cylindrical condition required in forming perfect threads on the pipes.

Modifications in the construction and arrangement of the parts may be made without departing from my invention. Two oppositely facing single acting cylinders may be employed instead of the double acting fluid pressure cylinders shown. The means for adjusting the head in which the toggles are connected may be changed and other variations may be made within.

The pipe rounding apparatus may be made to be formed separated and apart from the threading machine instead of being applied to the carriage of a pipe threading machine, as shown, and other variations may be made, within the scope of the appended claims.

I claim:—

1. A pipe rounding mechanism comprising a carriage having a window therein, oppositely facing pipe rounding blocks in said window, and means for causing a relative approach of said rounding blocks, said means being adjustable to vary the path of movement of one of said blocks in said window.

2. A pipe rounding mechanism comprising a carriage having a window therein, pipe rounding blocks removably mounted in said window, a chuck movably mounted in the window to which one of said rounding blocks is detachably secured, and means for reciprocating said chuck to actuate the rounding block secured thereto, said means being adjustable to vary the path of movement of the chuck and attached rounding block in said window.

3. A pipe rounding mechanism comprising a carriage having a window therein, pipe rounding blocks removably mounted in said window, a chuck movably mounted in the window to which one of said rounding blocks is detachably secured, toggle links connected to said chuck for actuating the chuck and attached rounding block and a cylinder having a plunger operatively mounted therein for actuating the toggles to reciprocate said chuck in said window.

4. A pipe rounding mechanism comprising a carriage having a window therein, pipe rounding blocks removably mounted in said window, a chuck movably mounted in the window to which one of said rounding blocks is detachably secured, toggle links connected to said chuck for actuating the chuck and attached rounding block, a cylinder having a plunger operatively mounted therein for actuating the toggles to reciprocate said chuck and yielding means forming a stop on said plunger to limit the movement thereof.

5. A pipe rounding mechanism comprising a carriage having a window therein, pipe rounding blocks removably mounted in said window, a chuck movably mounted in the window, to which one of said rounding blocks is detachably secured, toggle links connected to said chuck for actuating the chuck and attached rounding block, a cylinder having a plunger operatively mounted therein for actuating the toggles to reciprocate said chuck and means for adjusting the toggle links to vary the path of movement of the chuck and attached rounding block.

6. In a pipe rounding mechanism, the combination with a carriage having a window therein, oppositely facing relatively movable pipe rounding blocks in said window, and a chuck mounted in said window, to which one of said rounding blocks is detachably secured, of toggle links connected to the chuck and to the carriage and arranged to cause relative movement of said rounding blocks, adjustable means connecting the carriage and toggle links to vary the path of movement of said chuck and attached rounding block, and power means on said carriage for actuating said toggles.

7. In a pipe rounding mechanism, the combination with a carriage having a window therein, oppositely facing relatively movable pipe rounding blocks in said window, and a chuck mounted in said window to which one of said rounding blocks is detachably secured, of toggle links connected to the chuck and the carriage and arranged to cause relative movement of said rounding blocks, adjustable means connecting the carriage and toggle links to vary the path of movement of said chuck and the rounding block attached thereto, and a fluid pressure cylinder having a plunger connected to said toggle links for actuating said links.

8. Pipe rounding mechanism comprising in combination a carriage having a window, a lower pipe rounding block, and a vertically adjustable upper pipe rounding block in said window, a chuck to which said upper rounding block is detachably secured, a toggle link pivoted at one end to said chuck, a second toggle link, an adjusting screw by which said second toggle link is pivotally connected to the carriage, a lengthwise horizontal reciprocatory plunger to which the adjoining ends of said toggle links are pivotally connected, and a double acting fluid pressure cylinder for actuating said plunger to thereby cause a relative movement of said rounding blocks.

9. Pipe rounding mechanism comprising in combination a carriage having a window, a lower pipe rounding block, and a vertically adjustable upper pipe rounding block in said window, a chuck to which said upper rounding block is detachably secured, a toggle link pivoted at one end to said chuck, a second toggle link, an adjusting screw and nut by which said second toggle link is pivotally connected to the carriage, means for turning said nut to move the adjusting screw, a lengthwise horizontal reciprocatory plunger to which the adjoining ends of said toggle links are pivotally connected, and a double acting fluid pressure cylinder for actuating said plunger, to thereby cause a relative movement of said rounding blocks.

10. Pipe rounding mechanism comprising in combination a carriage having a window, a lower pipe rounding block, and a vertically adjustable upper pipe rounding block in said window, a chuck to which said top rounding block is detachably secured, a toggle link pivoted at one end to said chuck, a second toggle link pivotally connected to the carriage, a lengthwise horizontal reciprocatory plunger to which the adjoining ends of said toggle links are pivotally connected, a fluid pressure cylinder for actuating the plunger to thereby cause a relative movement of the rounding blocks, and yielding means on said plunger engaging with the carriage for limiting the reciprocating movement of the plunger.

11. Pipe rounding mechanism comprising in combination a carriage having a window, a lower pipe rounding block, and a vertically adjustable upper pipe rounding block in said window, a chuck to which said top rounding block is detachably secured, a toggle link pivoted at one end to said chuck, a second toggle link, an adjusting screw and nut by which said second toggle link is pivotally connected to the carriage, a hand wheel on said nut, a lengthwise horizontal reciprocatory plunger to which the adjoining ends of said toggle links are pivotally connected, a fluid pressure cylinder for actuating the plunger, to thereby cause a relative movement of the rounding blocks, and yielding means on said plunger engaging with the carriage for limiting the reciprocating movement of the plunger.

12. Pipe rounding mechanism comprising in combination a carriage having a window, a lower pipe rounding block, and a vertically adjustable upper pipe rounding block in said window, a chuck to which said upper rounding block is detachably secured, a toggle link pivoted at one end to said chuck, a second toggle link, an adjusting screw and nut by which said second toggle link is pivotally connected to the carriage, means for turning said nut to move the adjusting screw, a lengthwise horizontal reciprocatory plunger, a sliding shoe on said plunger to which the overlapping ends of said toggle links are pivotally connected, and means for actuating said plunger to thereby cause a relative movement of said pipe rounding blocks.

13. Pipe rounding mechanism comprising, in combination, a carriage having a window, opposite and relatively adjustable, vertically movable pipe rounding dies in said window, and means for causing a relative approach of said dies, said means including toggle links, means adjustably connecting one toggle link to said carriage, a horizontally reciprocating plunger to which the adjoining ends of the toggle links are pivotally connected, and a double acting fluid pressure cylinder for actuating said plunger.

14. Pipe rounding mechanism comprising, in combination, a carriage having a window and opposite relatively adjustable and relatively movable pipe rounding dies in said window, means for causing a relative approach of said dies, said means including a horizontally reciprocating plunger and a cylinder for actuating said plunger, toggle links having overlapping ends pivotally connected to said plunger, means adjustably connecting one toggle link to said carriage, and means pivotally connecting the end of the other toggle link to the vertically moving rounding block.

15. In pipe rounding mechanism, the combination with a carriage having a window and oppositely facing vertically movable, and relatively adjustable pipe rounding blocks in said window, of means for causing a relative approach of said dies, said means including a horizontally reciprocating plunger and a fluid pressure cylinder for actuating said plunger, toggle links having overlapping ends pivotally connected to said carriage, and means operatively connecting the end of the other toggle link to the vertically moving rounding block.

16. In pipe rounding mechanism, the combination with a carriage having a window and oppositely facing vertically movable and relatively adjustable pipe rounding blocks in said window, of means for causing a relative approach of said dies, said means including a horizontally reciprocating plunger and a fluid pressure cylinder for actuating said plunger, toggle links having overlapping ends pivotally connected to said plunger, means adjustably connecting one toggle link to said carriage, means operatively connecting the end of the other toggle link to the vertically moving rounding block, and yielding stops for limiting the travel of said horizontal plunger.

17. Pipe rounding mechanism comprising in combination a carriage having a window, a bottom pipe rounding block, and a vertically movable, vertically adjustable top pipe rounding block in said window, a toggle link pivoted at one end to said rounding block, a second toggle link pivotally connected to said carriage, adjustable means by which said second toggle link is pivotally connected to the carriage, a lengthwise horizontal reciprocating plunger to which the overlapping ends of said toggle links are pivotally connected, and means for actuating said plunger in reciprocating said top rounding block.

18. Pipe rounding mechanism comprising in combination a carriage having a window, a bottom pipe rounding block, and a vertically movable, vertically adjustable top pipe rounding block in said window, a toggle link pivoted at one end to said rounding block, a second toggle link pivotally connected to said carriage, adjustable means by which said second toggle link is pivotally connected to the carriage, a lengthwise horizontal reciprocating plunger to which the overlapping ends of said toggle links are pivotally connected, means for actuating the plunger in reciprocating said top rounding block, and yielding means on said plunger engaging with the carriage for limiting the reciprocatory movement of the plunger.

19. Pipe rounding mechanism comprising in combination a carriage having a window, vertically movable, and relatively adjustable pipe rounding blocks in said window, a toggle link pivoted at one end to one rounding block, a second toggle link, an adjusting screw by which said second toggle link is pivotally connected to the carriage, a horizontally reciprocating plunger to which the adjoining ends of said toggle links are pivotally connected, and means for actuating said plunger to thereby cause a relative vertical movement of said rounding blocks.

20. Pipe rounding mechanism comprising in combination a carriage having a window, vertically and relatively adjustable pipe rounding blocks in said window, a chuck to which one rounding block is detachably secured, a toggle link pivoted at one end to said chuck, a second toggle link, an adjusting screw and nut by which said second toggle link is pivotally connected to the carriage, a reciprocatory plunger to which the adjoining ends of said toggle links are pivotally connected, and means for actuating said plunger to thereby cause a relative movement of said rounding blocks.

21. Pipe rounding mechanism comprising in combination a carriage having a window, relatively movable, and relatively adjustable pipe rounding blocks in said window, a chuck to which one rounding block is detachably secured, a toggle link, pivoted at one end to said chuck, a second toggle link pivotally connected to the carriage, a reciprocatory plunger to which the adjoining ends of said toggle links are pivotally connected, and a fluid pressure cylinder for actuating the plunger to thereby cause a relative movement of the rounding blocks.

22. Pipe rounding mechanism comprising in combination a carriage having a window, relatively movable, and relatively adjustable pipe rounding blocks in said window, a chuck to which one rounding block is detachably secured, a toggle link pivoted at one end to said chuck, a second toggle link, adjustable means by which said second toggle link is pivotally connected to the carriage, a reciprocatory plunger to which the adjoining ends of said toggle links are pivotally connected, and a fluid pressure cylinder for actuating the plunger to thereby cause a relative movement of the rounding blocks.

23. Pipe rounding mechanism comprising in combination a carriage having a window, relatively movable, and relatively adjustable pipe rounding blocks in said window, a chuck to which one rounding block is detachably secured, a toggle link pivoted at one end to said chuck, a second toggle link, adjustable means by which said second toggle link is pivotally connected to the carriage, a reciprocatory plunger to which the adjoining ends of said toggle links are pivotally connected, a fluid pressure cylinder for actuating the plunger to thereby cause a relative movement of the rounding blocks, and yielding means on said plunger engaging with the carriage for limiting the reciprocating movement of the plunger.

24. Pipe rounding mechanism comprising in combination a carriage having a window, opposite and relatively adjustable pipe rounding dies in said window, and means for causing a relative approach of said dies, said means including toggle links, means adjustably connecting one toggle link to said carriage, a reciprocating plunger, a sliding shoe to which the adjoining ends of the toggle links are pivotally connected, and means for actuating said reciprocating plunger.

In testimony whereof, I have hereunto set my hand.

DAVID HEGGIE.

Witnesses:
Jas. H. Flemiven,
Arthur R. Graber.